United States Patent [19]
Stewart et al.

[11] Patent Number: 5,761,990
[45] Date of Patent: Jun. 9, 1998

[54] BARBECUE COOKER APPARATUS AND PROCESS

[76] Inventors: James M. Stewart, deceased, late of Greenville, S.C.; Rita D. Stewart, personal representative, Box 6161, Station B, Greenville, S.C. 29606

[21] Appl. No.: 910,420

[22] Filed: Aug. 13, 1997

Related U.S. Application Data

[63] Continuation of Ser. No. 638,467, Apr. 26, 1996, abandoned, which is a continuation of Ser. No. 105,347, Aug. 10, 1993, abandoned, which is a continuation-in-part of Ser. No. 757,656, Sep. 6, 1991, Pat. No. 5,242,703, which is a continuation-in-part of Ser. No. 461,954, Jan. 8, 1990, Pat. No. 4,990,723, which is a continuation-in-part of Ser. No. 375,194, Jun. 30, 1989, abandoned.

[51] Int. Cl.⁶ .......................................... A47J 37/04
[52] U.S. Cl. ...................... 99/401; 99/447; 126/41 R; 126/39 J; 426/523
[58] Field of Search .................... 99/401, 447, 448, 99/446, 449, 450, 400; 126/39 J, 25 R, 91 R, 91 A, 92 B, 41 R; 426/523

[56] References Cited

U.S. PATENT DOCUMENTS

| | | | |
|---|---|---|---|
| 3,003,409 | 10/1961 | Mills . | |
| 3,348,472 | 10/1967 | Anetsberger et al. | 99/447 |
| 3,682,643 | 8/1972 | Foster . | |
| 3,688,685 | 9/1972 | Wrench | 219/395 |
| 3,805,688 | 4/1974 | Gvozdjak | 99/425 |
| 3,820,525 | 6/1974 | Pond | 126/21 A |
| 4,062,340 | 12/1977 | Huff | 126/25 R |
| 4,089,258 | 5/1978 | Berger | 126/39 J |
| 4,164,175 | 8/1979 | Burstein et al. | 99/447 |
| 4,321,857 | 3/1982 | Best | 99/446 |
| 4,607,609 | 8/1986 | Keating | 126/39 J |
| 4,663,517 | 5/1987 | Huff et al. | 219/404 |
| 4,727,853 | 3/1988 | Stephen et al. | 126/41 R |
| 4,762,059 | 8/1988 | McLane, Sr. | 99/446 |
| 4,886,044 | 12/1989 | Best | 99/400 |

FOREIGN PATENT DOCUMENTS 0483598  9/1929  Germany .................. 126/39 J

*Primary Examiner*—Reginald L. Alexander
*Attorney, Agent, or Firm*—Hardaway Law Firm, PA

[57] ABSTRACT

A barbecue cooker for cooking foods having a cooker bowl, a closure for the bowl, one or more heat sources for producing heat extended within the bowl, and an infrared emitter positioned within the bowl above and adjacent to each heat source. A movable support structure is also taught for revolving food around a central heat source.

19 Claims, 7 Drawing Sheets

BARBECUE COOKER APPARATUS AND PROCESS

CROSS REFERENCE TO RELATED APPLICATIONS

This application is a file wrapper continuation of application Ser. No. 08/638,467 filed Apr. 26, 1996, which is a FWC of 08/105,347, filed Aug. 10, 1993, which is a CIP of 07/757,656 filed Sep. 6, 1991, which and now U.S. Pat. No. 5,242,703, which is a CIP of 07/461,954 filed Jan. 8, 1990 which is now U.S. Pat. No. 4,990,723, which is a CIP of 07/375,194, filed Jun. 30, 1989 which is now abandoned.

BACKGROUND OF THE INVENTION

This invention relates generally to barbecue cookers, and more particularly to a barbecue cooker providing optimum results in slow cooking by duplicating the flavor and tenderness of a wood-fired pit cooker, as well as providing for faster cooking of other foods. Both modes are predetermined setups and require minimum skill from the chef.

A variety of cooking devices have been developed over recent history in an effort to make cooking more efficient. Radiation of a lower frequency (long waves) is known to penetrate organic matter more easily than radiation of a higher frequency. Therefore, low frequency infrared can be used to cook meats without charring them. One device taking advantage of this phenomenon is shown in U.S. Pat. No. 3,003,409. Similar devices are shown by U.S. Pat. Nos. 3,682,643 and 3,820,525.

Other cooking devices have been developed with an eye toward enhancing the flavor of food as well as the enjoyment of the user. Traditional charcoal barbecue cookers, e.g. U.S. Pat. No. 4,062,340, are within this category.

U.S. Pat. No. 3,688,685 describes a large, commercial-type barbecue cooker which cooks with electric heating elements. A similar device intended to be used with smaller quantities of food is shown by U.S. Pat. No. 4,663,517.

U.S. Pat. Nos. 4,677,964 and 4,727,853 disclose barbecue cookers using gas as a source of heat.

U.S. Pat. No. 4,321,857 discloses an infrared gas grill for cooking items, but has no provision for balancing radiation and heat.

While the above patents exemplify the multitude of cooking devices, there exists much room for improvement in the art.

SUMMARY OF THE INVENTION

It is thus an object of this invention to provide a novel barbecue cooker.

It is another object of this invention to provide a novel barbecue cooker that can slow cook foods to perfection through a proper combination of heat, temperature and distance between the heat source and the food, as well as being able to cook foods quickly.

It is a further object of this invention to provide such a novel barbecue cooker which needs no adjustments to cook foods to perfection.

It is a still further object of this invention to provide such a novel barbecue cooker that can revolve food around a central heat source to evenly cook food.

These as well as other objects are accomplished by a barbecue cooker comprising a cooker bowl, a closure for the bowl, one or more heat sources within the bowl, and one or more infrared emitters positioned within the bowl above and adjacent to the heat source.

DETAILED DESCRIPTION

In accordance with this invention, it has been found that the cooking of meats can be accomplished with the most desirable flavor characteristics and a minimum of effort. Total heat, which determines temperature within a cooker, and emitter temperature, which determines the wavelength of infrared radiation, have been predetermined and set, and the cooker of this invention enables these variables to be utilized in an errorless fashion by those unskilled in the art of cooking. No experience is necessary, and adjustments are not needed for cooking food under desirable conditions to yield results which are easily repeatable. Many other advantages and features will become apparent from a reading of the following description given with reference to the various figures of drawings.

Figure 1:
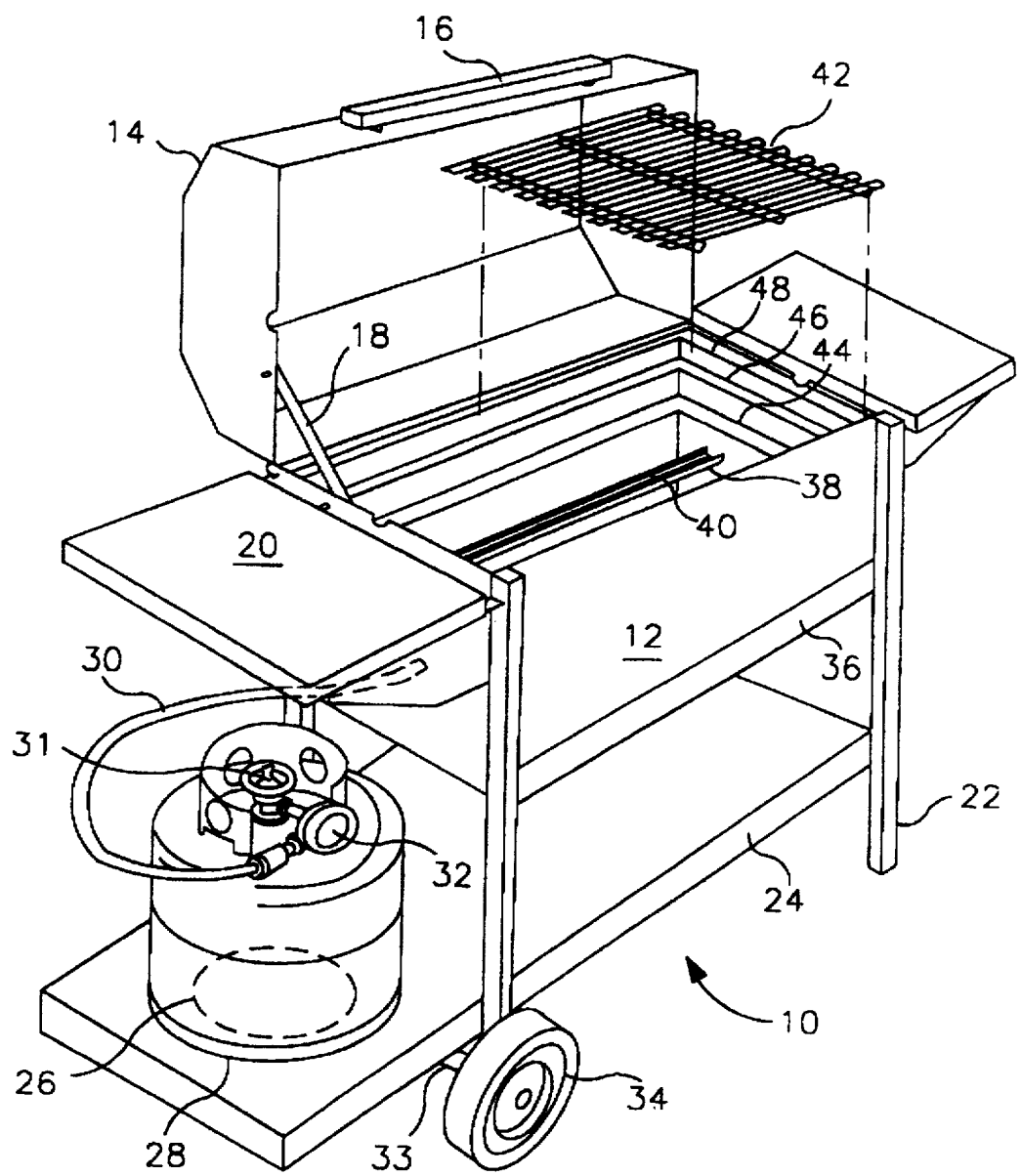
FIG. 1 of the drawings is a perspective view of a barbecue cooker constructed in accordance with this invention.

FIG. 1 of the drawings shows a barbecue cooker 10 constructed in accordance with the present invention. Cooker 10 generally comprises a cooker bowl 12 and an enclosure for cooker bowl 12 such as hinged lid 14. Hinged lid 14 includes a wooden handle 16, and a prop 18 to maintain hinged lid 14 in an open position. Cooker 10 may be provided with utility side boards 20, which preferably are wooden. Cooker 10 is supported by legs 22 which preferably are connected to a bottom shelf 24. In accordance with this invention, bottom shelf 24 has a hole 26 defined therein, seen in phantom, which is adapted to receive a portion of a gas container, shown as propane tank 28. The heat source in this embodiment of the invention comprises propane tank 28 which has a gas line 30 extending therefrom. Communicating with tank 28 at an end opposite hole 26 is an open/close valve 31 and a pressure reducing valve 32 to provide propane gas preferably at an industry standard of 11 W.I. Other gases and pressures may be utilized. The heat source according to this invention also could be an electric heat source, as discussed further herein. An axle 33 and wheels 34 are shown attached to one pair of legs 22 in order to enable cooker 10 to easily be moved.

Figure 2:
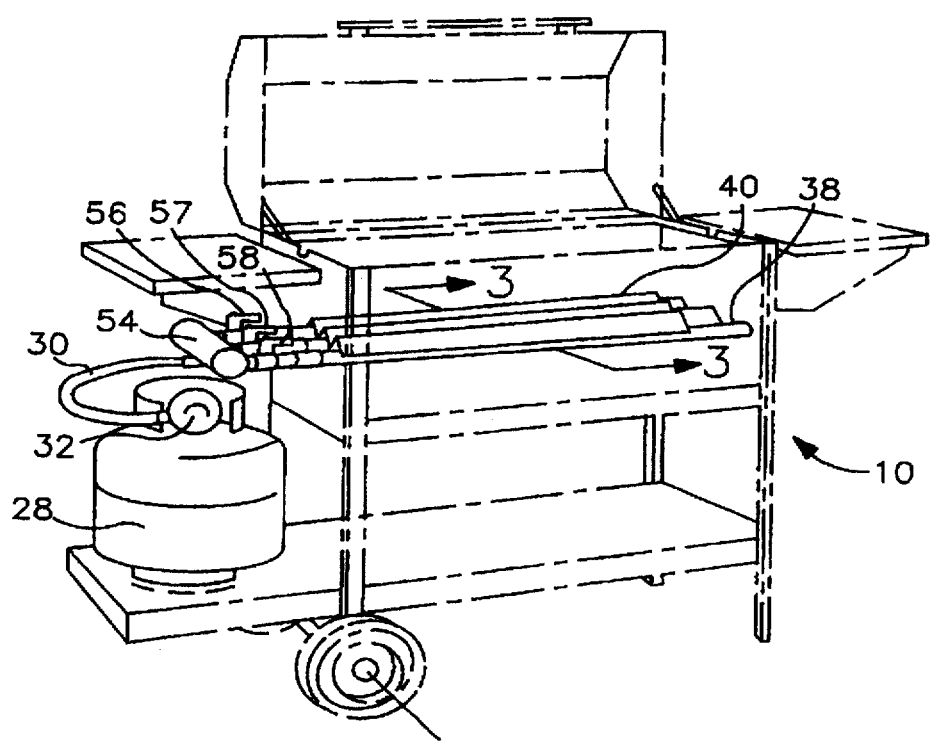
FIG. 2 of the drawings is a partial view in phantom of a barbecue cooker of FIG. 1.
Figure 3:
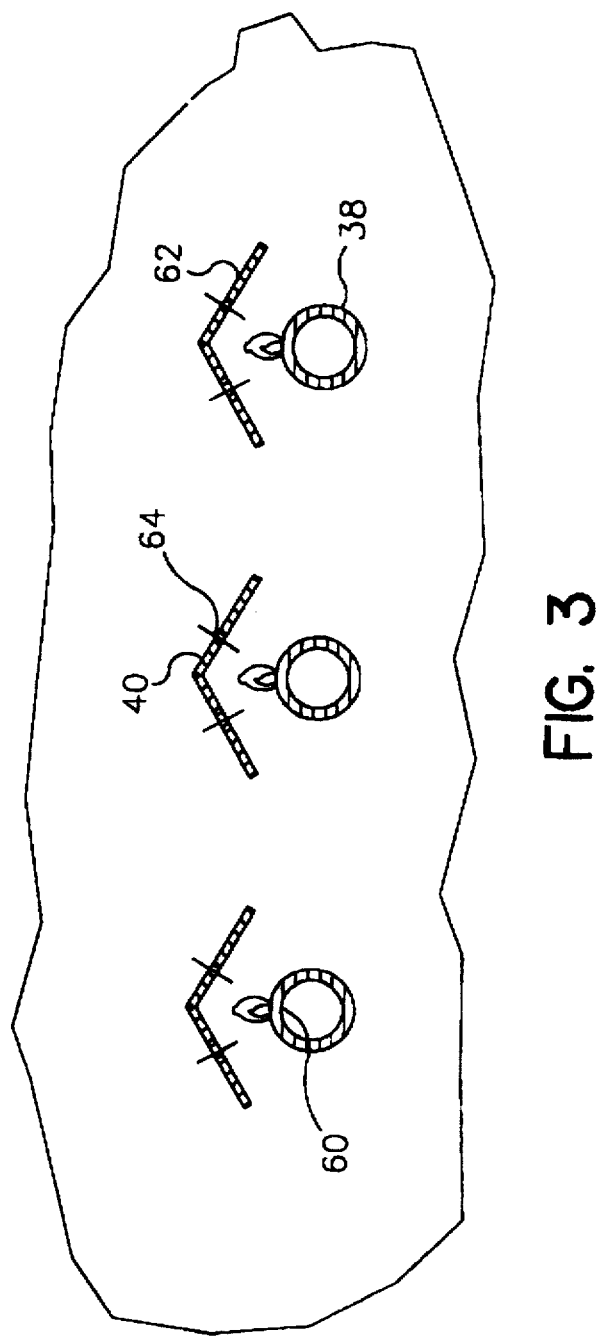
FIG. 3 of the drawings is a cross-section view drawn along line 3—3 of FIG. 2.

Cooker 10 may include a drawer 36 or some other means for removing fat, drippings and/or ashes. Extending through cooker 10 are one or more gas tubes such as gas tube 38, with infrared emitters 40 positioned adjacent and above the tubes such as the gas tube as best illustrated in FIGS. 2 and 3. Cooking grate 42 is illustrated out of position, but can be placed on various support levels 44, 46 or 48 within cooker 10.

FIG. 2 of the drawings is a perspective view in partial phantom of cooker 10 utilizing bottle gas as a heat source. FIG. 2 illustrates a preferred embodiment of cooker 10 utilizing tank 28 to supply gas by way of reducing valve 32, gas line 30, manifold 54 and on/off valves 56, 57 and 58 to gas tubes such as gas tube 38. In a preferred embodiment, there are three gas tubes such as gas tube 38, each spaced equally apart from one another and extending lengthwise through cooker 10, and having an infrared emitter 40 positioned above and adjacent to each. A platform 59, here comprising a movable, metallic, open-bottomed box, functions as a means of support for wood or other flavor enhancers. The wood will slowly char, helping to give the food a smoked taste.

Any heated body gives off infrared radiation. All cookers, therefore, use infrared radiation. The frequency of the infrared is dependent upon the temperature of the emitter. Charcoal fire, heated lava rock and non-controlled metal plates give off mixed frequency infrared radiation. The heated bodies also heat air by convection, which is sensible heat. Sensible heat and radiant heat are different and are to be considered separately. Herein lies the principle difference between this and other barbecue cookers.

FIG. 3 of the drawings is a cross-section view drawn along line 3—3 of FIG. 2 illustrating a preferred embodiment of a cooker according to this invention. Illustrated in FIG. 3 are three gas tubes such as gas tube 38 having apertures 60 defined through the tops thereof so as to allow flames to be produced from the gas tubes at the very top of each gas tube. Each gas tube such as gas tube 38 has an infrared emitter such as emitter 40 positioned above and adjacent to the gas tube. The emitters are shown as comprising two rectangular metal plates 62 which are joined longitudinally. The plates are preferably constructed of stainless steel, and they are positioned at an angle to one another above the gas tubes. This configuration enables the emitters to absorb heat from the gas tubes and emit infrared radiation to cook food placed in the cooker. Air within the cooker is also heated by convection. In the preferred embodiment, the angle between plates 62 is between 90° and 120° providing a non-planar, downwardly sloped top side wherein an angle of 105° provides optimal results. This configuration allows plates 62 to be flat enough to radiate heat efficiently toward the food to be cooked and steep enough to allow most fats to run off. This configuration also prevents food drippings from coming into contact with flames provided by the gas tubes, thereby inherently providing protection from flare-ups which are common with conventional gas grills. Any remaining food drippings that do not drain off will quickly vaporize. The vapors will surround the food and contribute to the desirable "outdoor" flavor. Movable platform 59, discussed above, is also shown as positioned on one of the emitters.

The precise positioning of the emitters over the gas tubes is an important feature of the present invention as, in the preferred embodiment, the bottom portions of plates 62 are positioned slightly above the gas tubes. This feature of the present invention allows the flames produced from gas tubes 38 to be essentially contained within and below the emitters. It is also envisioned according to this invention that the emitters can extend generally around and below the gas tubes.

After gas is provided in the amount required to heat the air within the cooker to its desired temperature, the surface areas of the plates of the emitters and their placement with respect to the gas tubes determine the temperature of the emitters. Modifications of an inverted "U" design can also be utilized.

With the configuration of the heat emitters positioned above the gas tubes and with the proper amount of heat in accordance with this invention, it is virtually impossible to over-cook or dry-out food in the slow-cooking mode.

As an important feature of the present invention, the emitters have a plurality of spaced holes 64 defined therein, the holes preferably positioned generally centrally on each plate 62 between the longitudinal axis where plates 62 are joined and the lowest point of each plate 62. It has been found that the addition of holes 64 in this manner allows the emitters to have a more uniform and hotter temperature.

Figure 4:
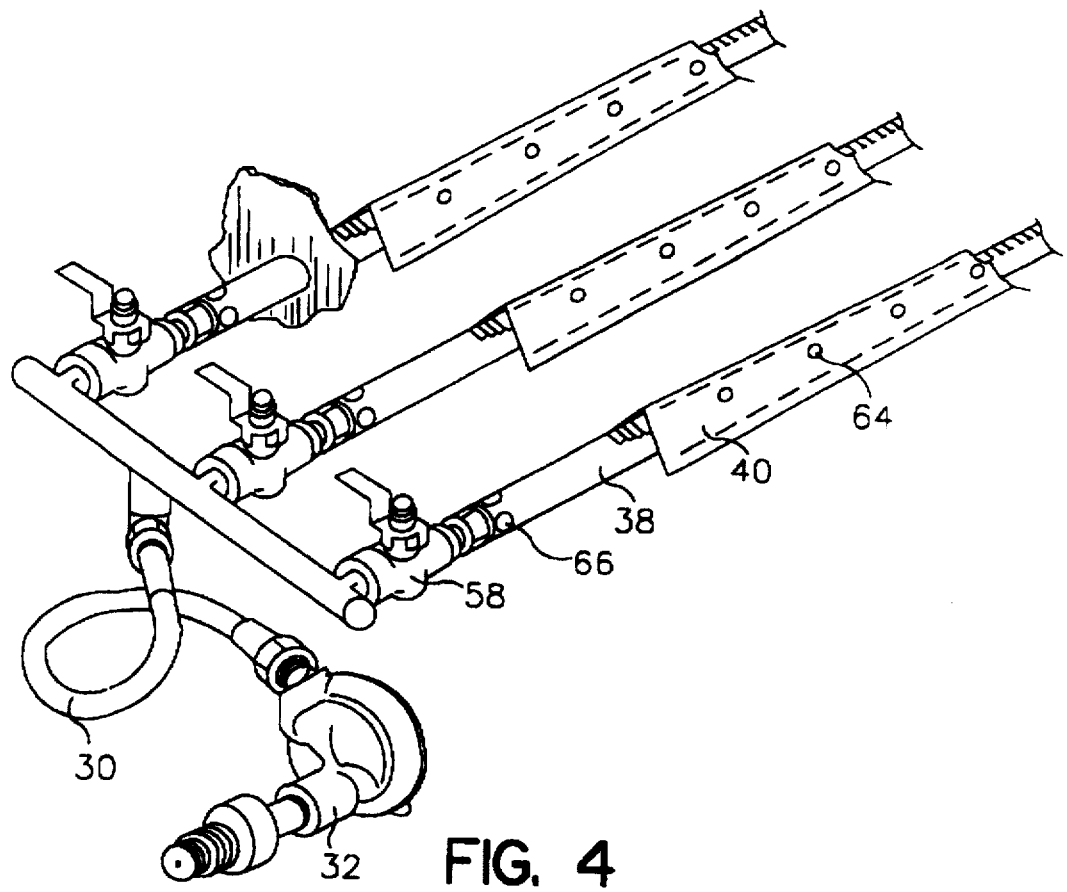
FIG. 4 of the drawings is a perspective view of gas heat sources with infrared emitters in accordance with this invention.

FIG. 4 of the drawings more clearly illustrates the positioning of spaced holes 64 as defined in the emitters. FIG. 4 illustrates three identical gas tubes, such as gas tube 38, with emitters, such as emitter 40, properly positioned above the gas tubes. On/off valves 56, 57 and 58 are in communication between gas line 30 and the gas tubes and determine the number of gas tubes to be used. Gas enters the gas tubes through orifices of specific size, such as orifice 65 see in FIG. 4A. The orifices are a predetermined size in order to precisely control the amount of gas to each gas tube, and thereby control the amount of heat produced therefrom. It is envisioned that the orifices could be of a larger size and be controlled by an adjustable valve, however, in the preferred embodiment of this invention, the orifices are a predetermined size for more precise control. It is possible to vary the size of the orifice, however, varying gases and pressures in the reducing valve might require a different size orifice.

Air intake holes 66 are illustrated in FIG. 4 on the gas tubes proximate to the orifices. The sizes of holes 66 determine the amount of air entrained in the gas mixture in the gas tubes.

Figure 4A:
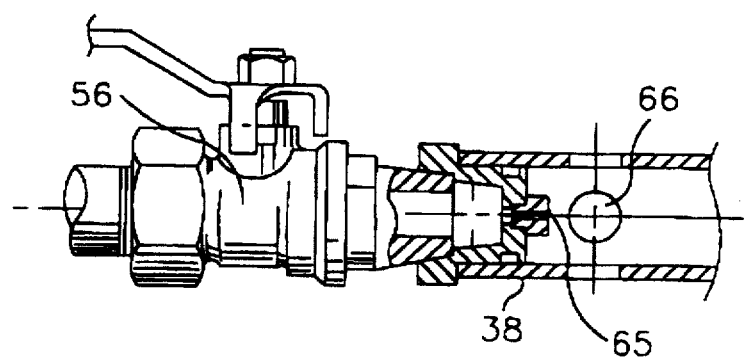
FIG. 4A of the drawings is a side view in partial cross section of a gas heat source in accordance with this invention.
Figure 5:
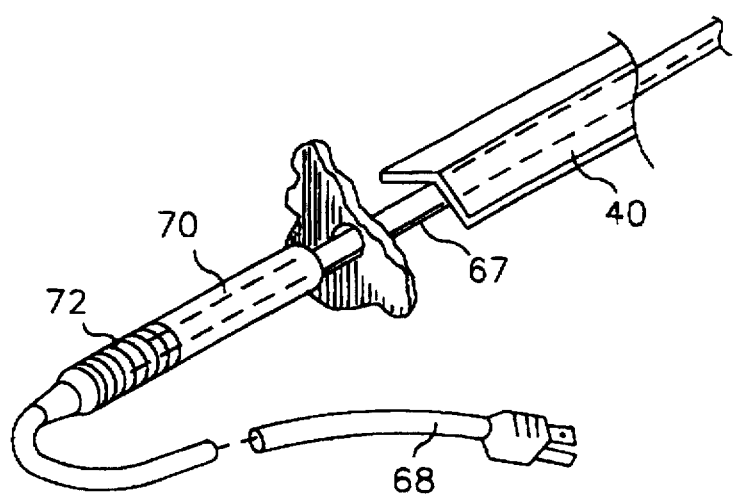
FIG. 5 of the drawings is a perspective view of an electric heat source with an infrared emitter in accordance with this invention.

Whether cooker 10 comprises one or more heat sources and emitters as illustrated in FIGS. 4, 4A and 5, it is envisioned that only a single heat source, and one positioned centrally within cooker 10, be utilized for pit cooking. For fast cooking of food items such as steaks and burgers, it is envisioned that more than one heat source be utilized.

FIG. 5 of the drawings illustrates the use of an electric heat source which heats heating element 67 and has heat emitter 40 positioned above and adjacent to the heating element. Energy to heating element 67 is supplied by electricity through power cord 68. A heater extension 70 with shielding means 72 is provided for a temperature drop between the actual heating element and the power cord 68. In this embodiment of cooker 10, only one electric heat source is utilized, however, it is envisioned that more than one electric heat source can be utilized with cooker 10. When an electric heat source is utilized, it is not necessary that the emitters have holes defined therein such as holes 64 used when the heat source is gas. The electric heat source is controlled by supplying wattage to provide the required heat and by selecting length and emitter area to provide an appropriate temperature. Heat and, temperature requirements are the same for both the gas and electric cookers.

Figure 6:
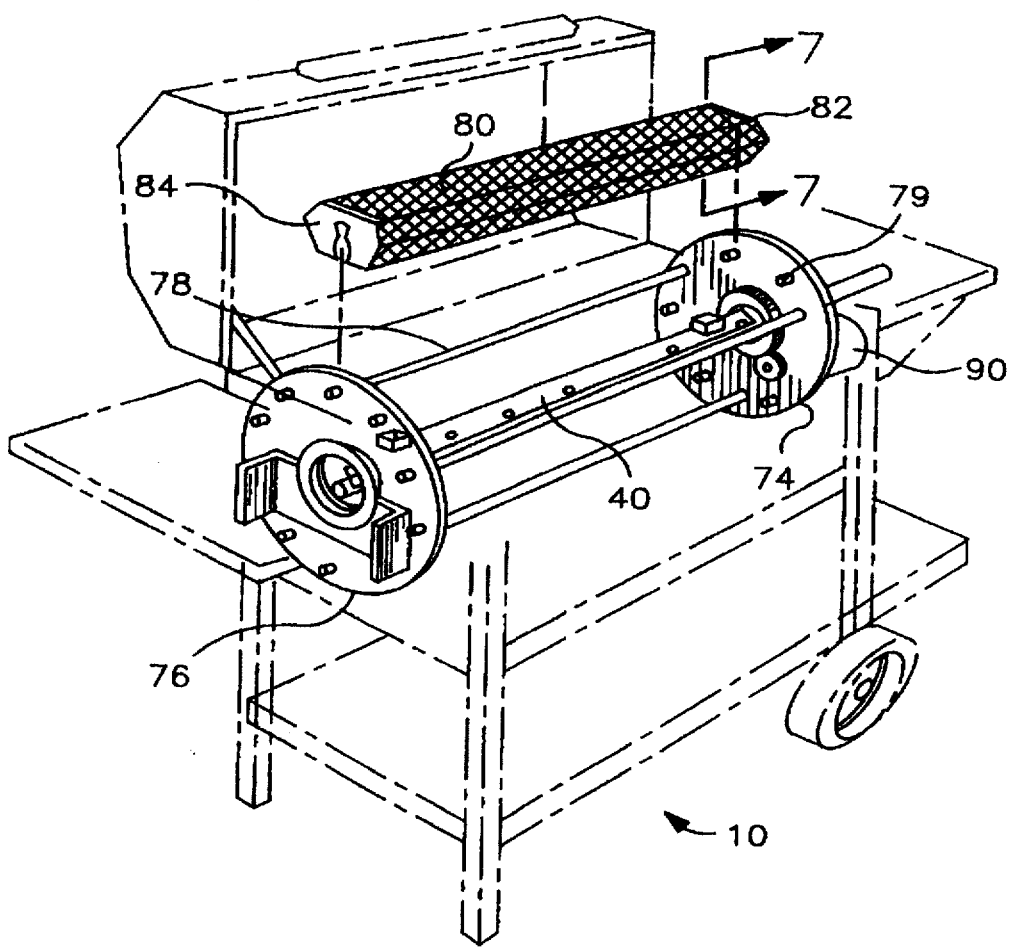
FIG. 6 of the drawings is a perspective view of a barbecue cooker with a movable support structure for holding food in accordance with this invention.

FIG. 6 of the drawings is a perspective view of cooker 10 utilizing a movable support structure in accordance with the present invention. As illustrated, and in the preferred embodiment, the movable support structure comprises opposing end plates 74 and 76 which are connected by a plurality of longitudinal rods 78 which are equally spaced from and parallel to one another and to the single heat source around which the movable support structure revolves. Between the longitudinal rods 78 are pins 79 adapted to engage and support a plurality of holders illustrated as baskets 80 for supporting food to be cooked therein. To enable baskets 80 to hang on pins 79 in a supporting manner, it is preferred that opposing slotted end plates 82 and 84 be utilized.

Figure 7:
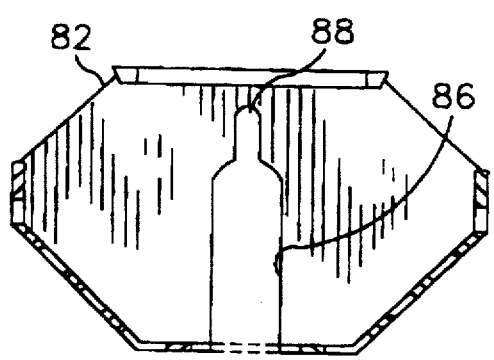
FIG. 7 of the drawings is an elevation view of an end plate used by baskets for supporting food to be cooked in accordance with this invention.

FIG. 7 is a cross-section view drawn along line 7-7 of FIG. 6 best illustrating the preferred design of slotted end plate 82. End plate 82 has a wide slot 86 which extends to form a more narrow slot 88 so as to allow baskets 80 to be adjustably positioned on pins 79 as desired for cooking purposes. Extending between the opposing slotted end plates 82 and 84, baskets 80 comprise wire mesh or other conventional means for supporting food therein.

The basic concept for cooker 10 as illustrated in FIG. 6 of the drawings is that food revolves around a central heat source. The heat source can be electric or gas, and preferably utilizes heat and infrared emitter 40 in accordance with this invention. The heat source thereby remains stationary while food supported in baskets 80 revolves around the heat source causing all sides of the food to evenly receive radiation from the heat source. This may be accomplished by having the pivot point of the basket above the center of gravity of the food/basket combination or, alternatively, the baskets may be powered. Baskets 80 can be lifted from pins 79 for easy loading and cleaning. If the heat source utilized is other than horizontal, it is preferred that the baskets be powered.

For revolving the movable support structure comprising baskets 80, rods 78 and opposing end plates 74 and 76, any conventional means can be utilized. FIG. 6 illustrates utilization of a drive motor 90 with appropriate drive gears.

When cooker 10 includes the movable support structure according to this invention, the heat source utilized can be slipped through apertures defined within opposing end plates 74 and 76. This feature allows for easy removal of the heat source from cooker 10. This allows for the movable support structure to be completely removed from cooker 10 to allow for easy cleaning or storage. Using half-bearings to support the movable support structure provides for easy positioning and removal of the movable support structure from cooker 10.

Cooker 10, with one emitter and the movable support structure is utilized only as a pit cooker.

Two or more heat sources, gas or electric, are normally used for regular grilling, while a single heat source is used for pit-cooking. When used as a pit-cooker, it is preferred that an ambient temperature of approximately 225° F. be maintained in the cooker with the lid closed. A temperature much less than this will result in excessively long cooking times and even dangerous bacterial growth. A temperature much above 225° F. causes food to dry out. The temperature of the infrared emitter 40 should be approximately 800° F. to 1200° F., with 1000° F. being the optimum temperature at the longitudinal axis of the heat emitter. Below this range of temperatures, meat tends to develop a watery consistency. Above this range of temperatures, meat tends to brown too quickly, tends to dry out, will not release optimum fat, and perhaps will burn before being fully cooked. Pit cooking by definition is a long cooking cycle whereby collagen (fibrous connective tissue) breaks down to produce fork-tender meat.

Long-wave infrared emissions penetrate food but do not seal it early in the pit-cooking cooking cycle, thereby allowing almost all fat to be rendered from the meat before cooking is complete. Late in the cooking cycle, the outside of the food browns and becomes crisp, while the inside becomes fork-tender and remains moist. Utilizing heat and emitters according to this invention allows even substantial overcooking to occur without drying out the food being cooked.

Not all foods need a long, tenderizing pit-cooking cycle. To this end, multiple heat sources can be positioned side-by-side in a preferred embodiment as discussed earlier with reference to FIG. 3. Each heat source has similar characteristics. When utilizing more than one heat source, cooking times are similar to those of conventional barbecue grills. The temperature within the cooker rises to a degree consistent with the needs of quicker cooking.

Water has an infrared peak absorption point at about 2.6 microns, which is the emission peak of 1500° F. This is the approximate temperature of conventional heat sources used for broiling and grilling, and it occurs when the heat source shows a dull to bright red color. The present invention has a lower temperature radiation source, which does not show color, is not absorbed (stopped) as readily by water in the meat, so does not boil of this water as fast. 1000° F. has an emission peak of about 3.6 microns. The ability to vary the distance between food to be cooked and the heat source, together with the proper balance between temperature and heat which is provided by the emitters maximizes the flavor of the food. Specifically, the wave-length of the infrared electromagnetic energy facilitates the absorption of heat by the food so that cooking is even throughout, and, at the completion of cooking, the meat is tender on the inside and crusty on the outside, while the food flavor is maximized.

With regard to the configurations taught in FIG. 3 of the drawings utilizing three spaced heat sources, a preferred method of cooking food within cooker 10 occurs when the outer heat sources produce approximately ten percent (10%) more heat than the center heat source. This produces better browning of meats when grilling, while maintaining the best conditions for pit-cooking. To control the amount of heat produced by the heat sources to pursue this advantageous result, slightly larger orifices are used with the outer gas tubes, such as on gas tubes 56 and 58 in FIG. 4.

It is thus seen that the present invention provides a novel barbecue cooker. It is also seen that such a novel cooker is provided which can slow cook food to perfection through a proper combination of heat, temperature, and distance between the heat source and food, as well as being able to cook foods quickly. It is further seen that such a novel cooker is provided which needs no adjustments to cook food to perfection. Once cooking times have been established to meet personal preferences, the results can be repeated at will. It is still further seen that such a novel cooker can be provided which can revolve food around a central heat source to evenly cook the food. Many variations are apparent to those of skill in the art, and such variations are embodied within the spirit and scope of the present invention as measured by the following appended claims.

That which is claimed is:

1. A barbecue cooker comprising:

a cooker bowl;

a closure for said bowl;

a gas heat source for producing heat extended within said cooker bowl and having a plurality of apertures defined therein for permitting flames to be produced from gas exiting said apertures; and a generally V-shaped infrared emitter having a top side pointed upwardly and an underside, said emitter fixedly positioned within said cooker bowl above and adjacent to said heat source whereby said gas heat source and said flames are centrally contained on the underside of said emitter and said emitter is capable of having a surface temperature of between 800° F. and 1200° F., said emitter formed by two plates merging longitudinally along a common edge to form a unitary structure.

2. The cooker according to claim 1 including a plurality of said gas heat sources within said cooker bowl and a plurality of said infrared emitters.

3. The cooker according to claim 2 including at least three (3) gas heat sources and infrared emitters and further including an orifice of predetermined size in communication with each of said gas heat sources.

4. The cooker according to claim 3 with on/off valves in communication with each of said orifices.

5. The cooker according to claim 1 wherein said plurality of apertures are defined through a top of said gas heat source.

6. The cooker according to claim 1 wherein a lowest part of said heat emitter is slightly above said gas heat source.

7. The cooker according to claim 1 wherein said plates are rectangular metal plates positioned at an angle to one another whereby said emitter absorbs heat from the heat source and emits infrared radiation.

8. The cooker according to claim 7 wherein said angle between said plates is between 90° and 120°.

9. The cooker according to claim 7 wherein said angle between said plates is approximately 105°.

10. The cooker according to claim 7 wherein said plurality of apertures are defined through a tip of said heat source so that said apertures are positioned beneath said longitudinal axis of said plates whereby the flames rise toward said longitudinal axis and are contained beneath said heat emitter.

11. The cooker according to claim 1 wherein said infrared emitter has a plurality of spaced holes defined therein.

12. The cooker according to claim 7 wherein a plurality of spaced holes are defined through each of said plates, each of said holes positioned generally centrally on each of said plates between said longitudinal axis and a lowest point of each plate.

13. A barbecue cooker comprising:

a cooker bowl;

a closure for said bowl;

an electric heat source for producing heat extended within said cooker bowl;

an infrared emitter having a generally V-shaped cross-section with a top side pointed upwardly and an underside, said emitter fixedly positioned within said cooker bowl above and adjacent to said heat source and said emitter having a surface temperature of between 800° F. and 1200° F., said emitter formed by two plates merging longitudinally along a common edge to form a unitary structure.

14. The cooker according to claim 13 including a plurality of said electric heat sources within said cooker bowl and a plurality of said infrared emitters.

15. The cooker according to claim 14 including at least three (3) of said electric heat sources and infrared emitters and further including on/off control means for controlling heat produced from each of said heat sources.

16. The cooker according to claim 13 wherein said non-planer top side is downwardly sloped.

17. A method of cooking food in a grill comprising the steps of:

providing a barbecue cooker comprising:

a cooker bowl;

a closure for said bowl;

a heat source for producing heat extended within said cooker bowl; and a V-shaped infrared emitter fixedly positioned within said cooker bowl above and adjacent to said heat source such that said emitter is pointed upwardly and centrally positioned above said heat source, said emitter formed by two plates merging longitudinally along a common edge to form a unitary structure inserting food within said cooker bowl;

heating said emitter with said heat source as said emitter absorbs heat and emits infrared while maintaining a temperature of between 800° F. and 1200° F.; and maintaining an ambient temperature of approximately 225° F. within said cooker bowl;

whereby said food is cooked by radiation.

18. A method of cooking food in a grill comprising the steps of:

providing a cooking apparatus comprising:

a cooker bowl;

a closure for said bowl;

at least three heat sources for producing heat positioned within said cooker bowl with one of said heat sources generally centrally positioned in said cooker bowl and with two of said heat sources spacedly positioned on either side of said centrally positioned heat source;

a V-shaped infrared emitter centrally positioned above and adjacent to each of said heat sources, said emitter formed by two plates merging longitudinally along a common edge to form a unitary structure;

activating said heat sources so that said two heat sources which are spacedly positioned on either side of said centrally positioned heat source produce more heat than said centrally positioned heat source; and inserting food to be cooked generally above said centrally positioned heat source;

whereby said emitters absorb heat from said heat sources and emit infrared to cook said food.

19. A barbecue cooker comprising:

a cooker bowl;

a closure for said bowl;

a gas heat source for producing heat extended within said cooker bowl and having a plurality of apertures defined through a top of said gas heat source for permitting flames to be produced from gas exiting said apertures; and a V-shaped infrared emitter having a top side and an underside, said emitter fixedly positioned within said cooker bowl above and adjacent to said heat source whereby said flames are centrally contained on the underside of said emitter and said emitter is capable of having a surface temperature of between 800° F. and 1200° F., said emitter formed from two plates merging longitudinally along a common edge to form a unitary structure.

* * * * *